United States Patent
Bauer

(10) Patent No.: US 8,413,064 B2
(45) Date of Patent: Apr. 2, 2013

(54) METHOD AND APPARATUS FOR GRAPHICALLY INDICATING THE PROGRESS OF MULTIPLE PARTS OF A TASK

(75) Inventor: Samuel M. Bauer, Colorado Springs, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1077 days.

(21) Appl. No.: 11/880,826

(22) Filed: Jul. 23, 2007

(65) Prior Publication Data

US 2008/0195948 A1 Aug. 14, 2008

Related U.S. Application Data

(60) Provisional application No. 60/889,448, filed on Feb. 12, 2007.

(51) Int. Cl.
G06F 3/048 (2006.01)

(52) U.S. Cl. ......... 715/772; 715/736; 715/748; 715/769

(58) Field of Classification Search .......... 715/719–721, 715/772, 771, 736, 748, 769
See application file for complete search history.

(56) References Cited

U.S. PATENT DOCUMENTS

| | | | | |
|---|---|---|---|---|
| 4,503,499 A | * | 3/1985 | Mason et al. | 718/101 |
| 5,301,348 A | * | 4/1994 | Jaaskelainen | 714/46 |
| 6,038,588 A | * | 3/2000 | Nagarajayya et al. | 718/102 |
| 6,115,640 A | * | 9/2000 | Tarumi | 700/99 |
| 6,480,955 B1 | * | 11/2002 | DeKoning et al. | 713/100 |
| 6,611,276 B1 | * | 8/2003 | Muratori et al. | 715/772 |
| 6,714,827 B1 | * | 3/2004 | Brown et al. | 700/97 |
| 6,901,558 B1 | * | 5/2005 | Andreas et al. | 715/772 |
| 6,934,916 B1 | * | 8/2005 | Webb et al. | 715/772 |
| 6,938,214 B2 | * | 8/2005 | Proulx et al. | 715/763 |
| 6,941,522 B2 | * | 9/2005 | Brown | 715/772 |
| 7,000,193 B1 | * | 2/2006 | Impink et al. | 715/771 |
| 7,594,228 B2 | * | 9/2009 | Lam | 718/102 |
| 7,607,104 B2 | * | 10/2009 | Maeda | 715/772 |
| 2002/0077879 A1 | * | 6/2002 | Uchida et al. | 705/9 |
| 2003/0005022 A1 | * | 1/2003 | Brown | 709/100 |
| 2003/0194062 A1 | * | 10/2003 | Nelson et al. | 379/67.1 |
| 2003/0233162 A1 | * | 12/2003 | Kawai et al. | 700/116 |
| 2004/0148604 A1 | * | 7/2004 | Steffens et al. | 718/100 |
| 2005/0081200 A1 | * | 4/2005 | Rutten et al. | 718/100 |
| 2005/0102631 A1 | * | 5/2005 | Andreas et al. | 715/772 |
| 2005/0262148 A1 | * | 11/2005 | Davitt | 707/104.1 |
| 2006/0013555 A1 | * | 1/2006 | Poslinski | 386/46 |
| 2006/0044307 A1 | * | 3/2006 | Song | 345/419 |
| 2006/0212329 A1 | * | 9/2006 | Lucas et al. | 705/8 |
| 2006/0277487 A1 | * | 12/2006 | Poulsen et al. | 715/772 |
| 2007/0033624 A1 | * | 2/2007 | Oh | 725/100 |
| 2007/0143169 A1 | * | 6/2007 | Grant et al. | 705/9 |
| 2007/0143803 A1 | * | 6/2007 | Lim | 725/89 |
| 2007/0168861 A1 | * | 7/2007 | Bell et al. | 715/701 |
| 2007/0277122 A1 | * | 11/2007 | Frijlink et al. | 715/854 |

(Continued)

OTHER PUBLICATIONS

German Patent and Trademark Office, Office Action dated May 5, 2009.

*Primary Examiner* — Ba Huynh

(74) *Attorney, Agent, or Firm* — Volentine & Whitt, PLLC

(57) ABSTRACT

In one embodiment, a computer-implemented method for graphically indicating a progress of multiple parts of a task involves 1) dividing the task, as a whole, into a plurality of work units, and 2) as the task is executed, and for each of the work units, separately indicating, via a graphical user interface, whether work was performed for each task part during each work unit. Other embodiments are also disclosed.

19 Claims, 3 Drawing Sheets

U.S. PATENT DOCUMENTS

2007/0288292 A1* 12/2007 Gauger ............... 705/9
2008/0031595 A1* 2/2008 Cho ............... 386/108
2009/0094546 A1* 4/2009 Anzelde et al. ............... 715/772
2009/0247417 A1* 10/2009 Haas et al. ............... 506/8

* cited by examiner

METHOD AND APPARATUS FOR GRAPHICALLY INDICATING THE PROGRESS OF MULTIPLE PARTS OF A TASK

CROSS-REFERENCE TO RELATED APPLICATION

This is a continuation of copending application Ser. No. 60/889,448 filed on Feb. 12, 2007, entitled "Method and Apparatus for an Improved Progress Monitor and Feedback During a Computer Process", the entire disclosure of which is incorporated into this application by reference.

BACKGROUND

Progress bars are commonly displayed by graphical user interfaces for the purpose of indicating that some type of work is underway and is approaching completion. The type of work may vary greatly and may include: searching a database; opening a web page; downloading a file from a remote device; sending data to a printer; applying a transformation (such as color enhancement, resizing, or contrast adjustment) to a digital photograph; or sending/receiving email.

A progress bar may variously show how fast work is progressing, whether work is progressing, or the percentage of work that is complete or remaining.

BRIEF DESCRIPTION OF THE DRAWINGS

Illustrative embodiments of the invention are illustrated in the drawings, in which.

DETAILED DESCRIPTION

Figure 1:
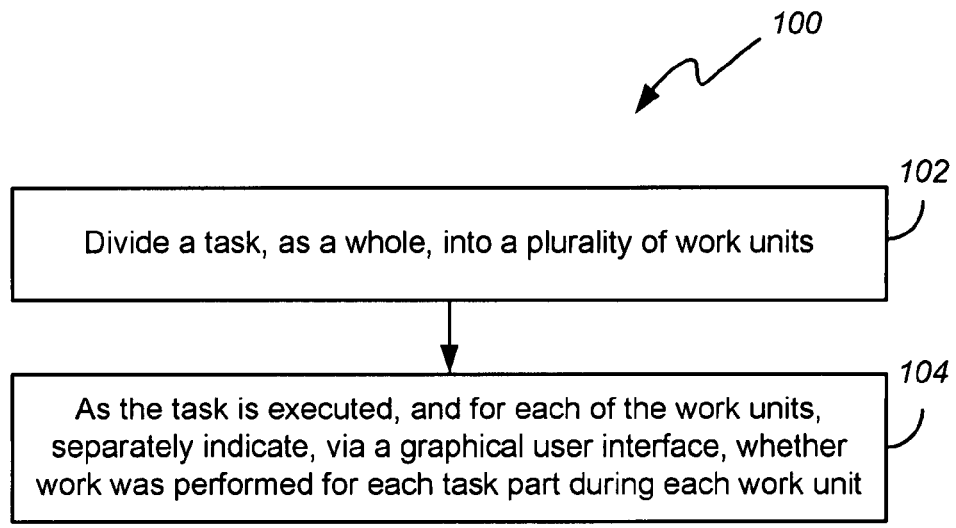
FIG. 1 illustrates an exemplary computer-implemented method for graphically indicating a progress of multiple parts of a task.

FIG. 1 illustrates a new and exemplary computer-implemented method 100 for graphically indicating the progress of multiple parts of a task. The method 100 comprises dividing the task, as a whole, into a plurality of work units (at block 102). As the task is executed, and for each of the work units, the method separately indicates, via a graphical user interface (GUI), whether work was performed for each task part during each work unit (at block 104).

The method 100 may be implemented by means of computer-readable code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable code is executable by a computer, to cause the computer to perform the method 100. The computer-readable code will typically comprise software, but could also comprise firmware or a programmed circuit.

Figure 2:
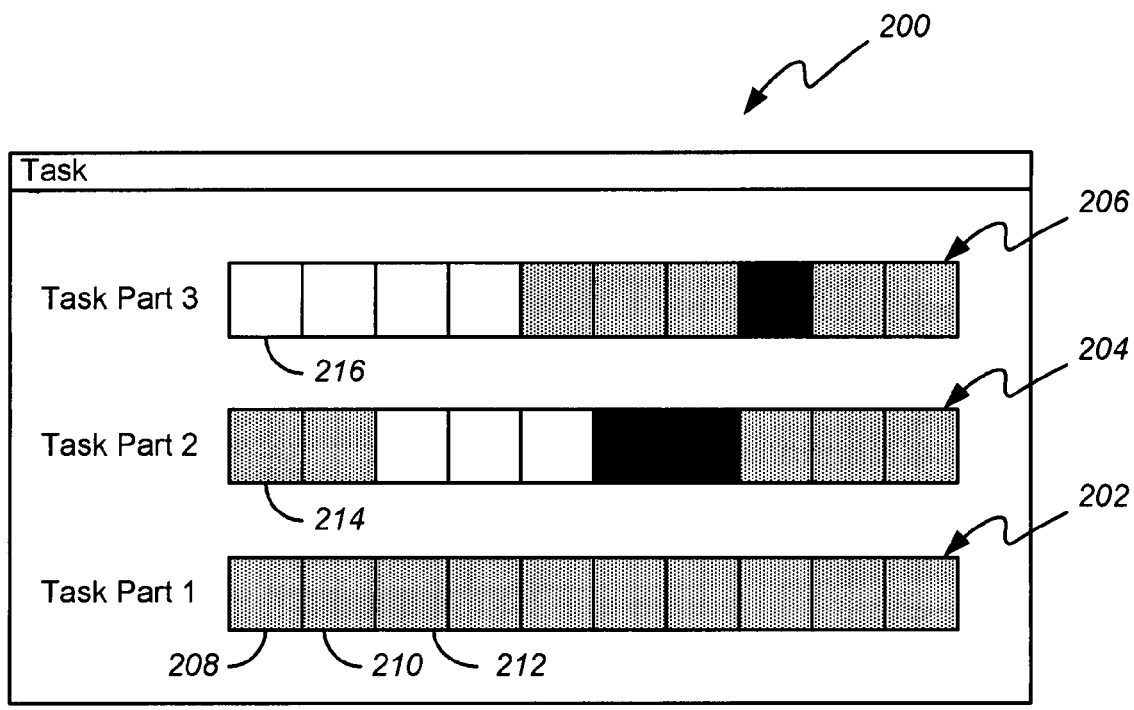
FIG. 2 illustrates an exemplary graphical user interface that may be employed by the method shown in FIG. 1.

FIG. 2 illustrates an exemplary GUI 200 that may be employed by the method 100. The GUI 200 displays a plurality of progress bars 202, 204, 206, each of which corresponds to a respective one of multiple parts of a task. By way of example, the task parts are labeled Task Part 1, Task Part 2, and Task Part 3. Each of the progress bars 202, 204, 206 comprises a plurality of display units, such as display units 208, 210, 212, 214 and 216. Each of the display units 208, 210, 212, 214, 216 corresponds to one of the work units determined by the method 100. By way of example, the display units 208, 210, 212, 214, 216 are shown to be blocks. However, the display units 208, 210, 212, 214, 216 could take alternate forms, such as icons.

The display units 208, 210, 212, 214, 216 of the different progress bars 202, 204, 206 are preferably aligned, such that all of the display units 208, 214, 216 in a particular column correspond to a common work unit.

Each of the display units 208, 210, 212, 214, 216 may be color coded to indicate whether work was performed during a respective one of the work units. For example, in one embodiment, when no work is performed for a particular task part and work unit, a corresponding display unit is displayed in white, or in a color that blends into the background color of the GUI 200. However, when work is performed for a particular task part and work unit, a corresponding display unit is displayed in a non-white color (such as green).

Display units 208, 210, 212, 214, 216 may also be color-coded to indicate whether certain events occurred during particular work units. Or, the display units 208, 210, 212, 214, 216 may be colored to indicate whether or not an error was encountered during a particular work unit. The display units 208, 210, 212, 214, 216 may also be color coded to indicate how many errors were encountered during a particular work unit (such as: no errors, fewer than 50 errors, or more than 50 errors). Display units 208, 210, 212, 214, 216 may also be color coded to indicate, for example, a quality of the work performed for a particular task part during a particular work unit. Quality of work may be determined in various ways, and may depend on the type of work being done (such as a type of data being processed).

For the purpose of this description, black and white are considered colors that may be used to color code display units 208, 210, 212, 214, 216. Also, in addition to (or instead of) color coding, indications of work done, events, or errors, may be indicated via different patterns for the display units 208, 210, 212, 214, 216, or via changes in displayed icon types.

The task and task parts that are the subjects of the method 100 and GUI 200 may take various forms. In one embodiment, the task may be the processing of a plurality of messages corresponding to a packetized data transmission, and the task parts may comprise the processing of data pertaining to different logical protocol layers of the messages.

Figure 3:
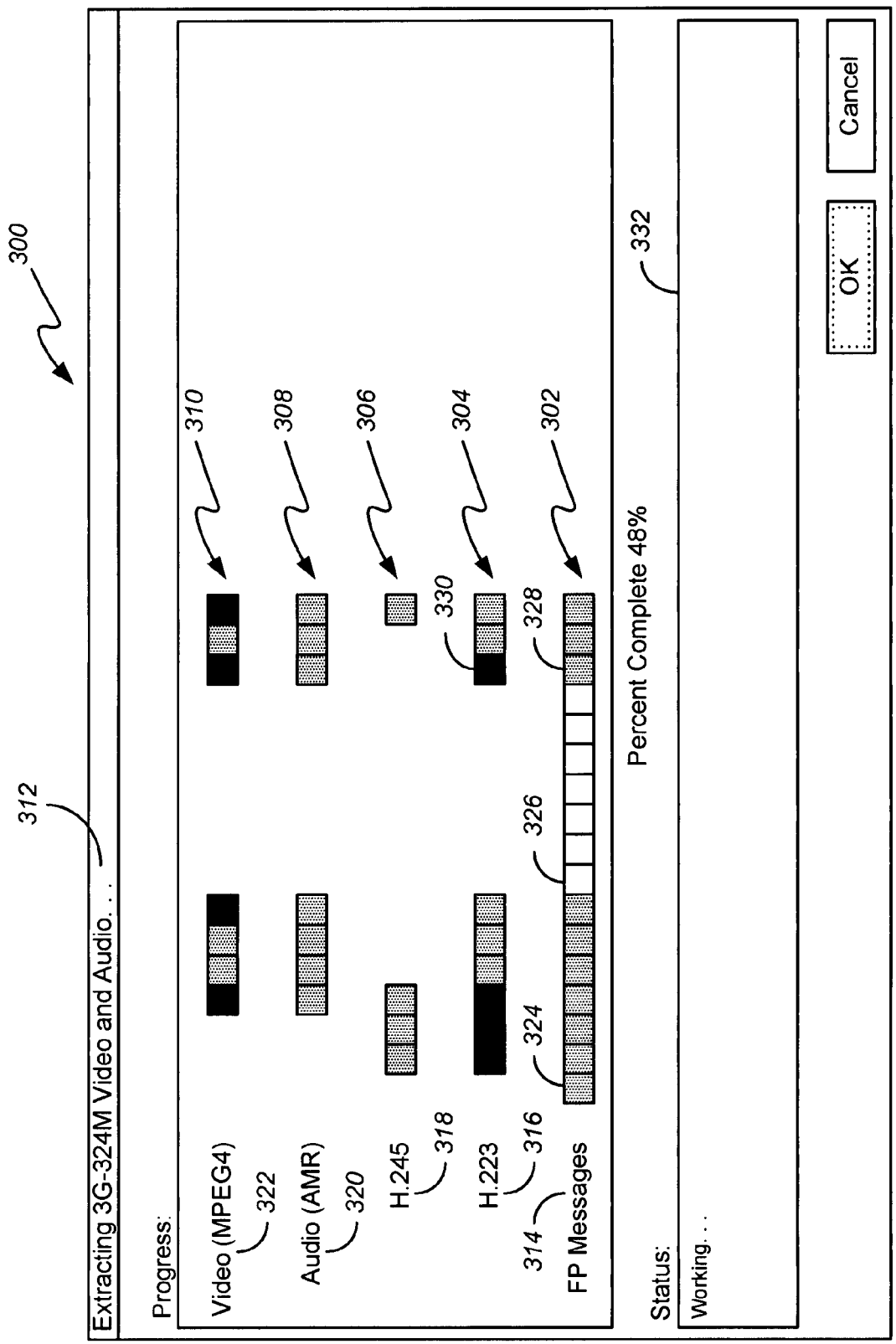
FIGS. 3 & 4 illustrate an exemplary adaptation of the GUI shown in FIG. 2, for the purpose of showing the progress of extracting and playing (or saving) 3G-324M audio/video/data.
Figure 4:
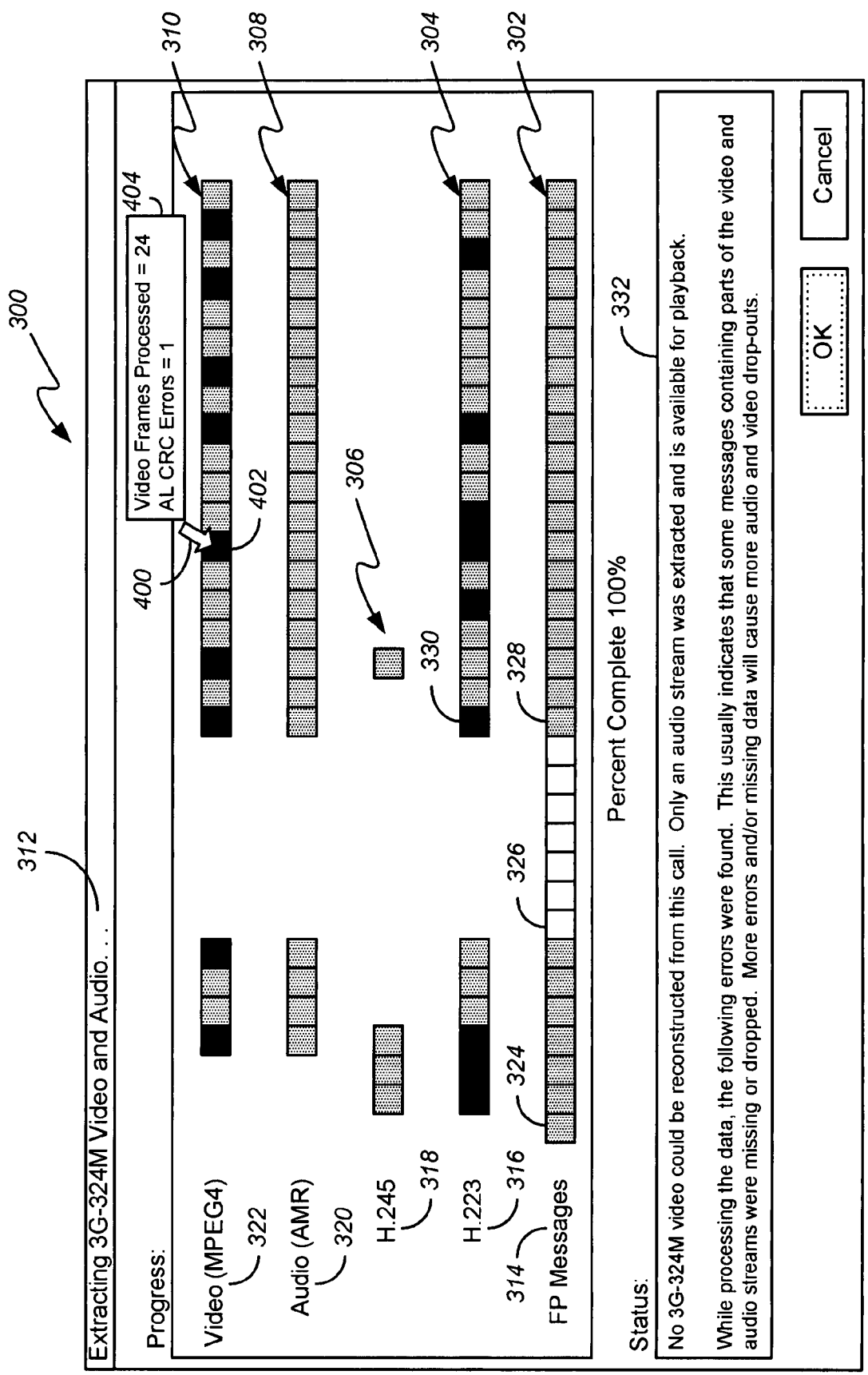

FIGS. 3 & 4 illustrate an exemplary adaptation 300 of the GUI 200, for the purpose of showing the progress of extracting and playing (or saving) 3G-324M audio/video/data. By way of example, a 3G-324M extraction process may proceed as follows. First, the messages of a packetized data transmission are parsed at the framing protocol (FP) or in-user plane protocol (IUUP) layer (both of which are considered FP protocols for purposes of this description), to determine whether they carry 3G-324M payload. If so, the 3G-324M payload is extracted, and concatenated with other extracted payloads, to form a continuous 3G-324M data stream. The 3G-324M data stream is then parsed (often as it is being formed), to look for one of the possible International Telecommunication Union technical standard H.223 (ITU-T H.223, or simply H.223) start-flag bit sequences. When an H.223 start sequence is found, the header following the start sequence is validated by computing a parity check or cyclic redundancy check (CRC), depending on the type of sequence found. If the H.223 header is good, data in the 3G-324M stream is extracted up until an end flag is found.

An H.223 header determines what kind of data (or payload) is contained in a frame. The data may be ITU-T H.245 control information (H.245), or part of an audio, video or data stream. Depending on the type of payload contained in a frame, the payload is processed as follows. If the payload is H.245 control information, the simple retransmission protocol (SRP) and channel segmentation and reassembly layer (CCSRL) headers for the control information are verified via CRC. If the CRC passes, the H.245 payload is decoded and used to determine: video and audio capabilities; the format being used to multiplex the audio, video, and data streams; or other information. If the payload in a frame is an audio, video or data stream defined by H.245, then an adaptation layer (AL) header is verified via CRC. If the header is good, the AL payload is concatenated with other data of the same stream, and the data is eventually assembled for playback (or saved).

The extraction and playing (or saving) of 3G-324M audio/video/data is a complex process and may involve the processing of a very large number of messages. Quite often, errors are detected in various protocols (e.g., via parity check or CRC). Erred frames are discarded, with the result being a minor or major effect on the reconstruction and playback of audio, video or data streams, depending on the frequency and positions of the errors.

In order to better communicate the progress of 3G-324M audio/video/data, and to indicate the frequency and position of error occurrences, the progress bars 302, 304, 306, 308, 310 shown in FIGS. 3 & 4 may be used. As displayed on the Title Bar 312, the task being completed is "Extracting 3G-324M Video and Audio . . . ". The multiple parts of the task include the processing of FP message data, H.223 data, H.245 data, audio data and video data, as indicated by the labels 314, 316, 318, 320, 322 on the left-hand side of the GUI 300. The task may include other task parts, but in the exemplary GUI 300, the progress of only FP, H.223, H.245, audio and video data extraction is shown. FIG. 3 illustrates an exemplary interim progress during task execution, and FIG. 4 illustrates an exemplary historical progress at task completion.

The progress of each task part is indicated by a respective progress bar 302, 304, 306, 308, 310 comprised of a plurality of blocks 324, 326, 328, 330 (i.e., display units). Each block 324, 326, 328, 330 corresponds to a respective work unit, and each work unit corresponds to a substantially equal number of messages in a packetized data transmission. That is, the number of messages in a 3G-324M data transmission may be divided by the maximum number of blocks that are displayable in one of the progress bars 302, 304, 306, 308, 310, and the resultant number of messages is equivalent to one work unit (or display unit).

Each column of blocks (i.e., one block in each progress bar 302, 304, 306, 308, 310, such as blocks 328 and 330) indicate the work done during the execution of one work unit, and each row of blocks 324, 326, 328 indicates the work done (or progress) on a particular task part during a given work unit. White blocks 326 (which are bounded by black borders in the case of FP messages, and which are not bounded by any border in the case of other data types) indicate that no work was completed for a particular data type (or layer type) during a particular work unit. Green blocks 324 indicate that data was successfully processed for a particular layer type and work unit. Red blocks 330 indicate that an error was detected in at least one of the data payloads processed for a particular layer and work unit.

As shown in FIG. 4, the hover of a graphical pointer 400 (such as a mouse pointer) over one of the display units 402 (blocks) may cause additional information about the work, performed during a work unit corresponding to the display unit 402, to be displayed in a pop-up window 404. Alternately, the additional information could be displayed in a stationary text field of the GUI 300, or in a dialog window. More generally, the GUI 300 may be programmed such that one or more predetermined user interactions (e.g., graphical pointer hover, click or double-click) with a particular display unit causes additional information to be displayed about the work performed during a work unit that corresponds to the particular display unit. The type of additional information that can be displayed may include, for example: the number of payloads or frames processed for a task part during the work unit; or a number of errors or predetermined events that were triggered by the task part during the work unit.

In one embodiment, the GUI 300 shown in FIGS. 3 & 4 may display the audio and video codecs that are used by extracted audio and video. When the 3G-324M extraction task begins, the names of the codes will not be known, and therefore cannot be displayed. However, upon processing and interpreting H.245 data that indicates the identities of the codecs, their names (AMR and MPEG4) may be displayed in parenthesis, below the respective "Audio" and "Video" task part labels 320, 322.

As also shown in FIGS. 3 & 4, the GUI 300 may provide a text box 332 for the display of textual progress updates, including a summary of particular errors or events. The GUI 300 may also display a "percent complete" for each task part for which progress is displayed.

Although FIGS. 3 & 4 illustrate one exemplary adaptation 300 of the GUI 200, the GUI 200 may also be adapted to other applications. For example, during enhancement of a digital photograph, there can be several stages of processing that need to be undertaken, such as: 1) converting the image from a stored compressed file format to a format in memory that is suitable for image manipulation; 2) scaling the image to a new size; 3) rotating the image 90 degrees; 4) enhancing the contrast of the image; 5) removing scratches in the image; and 6) compressing the image and saving it to a new file. In this example, a progress bar could be displayed for any or all of the above processing stages. For example, a first progress bar could display whether image bytes were decompressed during a particular work unit (where the work unit might be a predetermined unit of time). The display units of the first progress bar might be color coded to indicate whether data was compressed using an acceptable or unacceptable ratio. A second progress bar could indicate the progress of image scaling, and indicate when scaling operations introduce loss of clarity due to picture artifacts or non-optimal scaling factors. A third progress bar could indicate the progress of removing scratches, and indicate when scratches were detected and removed, and the predicted effectiveness of their removal.

As another example, the GUI 200 could be adapted for use with a web browser. In such an application, different progress bars might indicate, for example, 1) the quantity, errors, retransmission attempts, and data rate of data transmitted to a website, 2) the quantity, errors, retransmission attempts, and data rate of data transmitted from a website, and 3) cookie activity.

Although the progress bars 202, 204, 206, 302, 304, 306, 308, 310 shown in FIGS. 2-4 are displayed in parallel, it is noted that the work corresponding to different task parts may be completed in parallel or in series (although a separate progress bar 202, 204, 206 is nonetheless displayed for each task part).

The method 100 and GUIs 200, 300 disclosed herein can be useful, in some cases, because they not only show the progress of an entire task, but they also show the progress of various parts of the task. The method 100 and GUIs 200, 300 can also be useful in that they can 1) give an overall view of the error count, quality, or number of events that are generated as work is being done, and 2) indicate the frequency and positions of errors or event occurrences.

What is claimed is:

1. A computer-implemented method for graphically indicating a progress of a plurality of task parts in relation to a progress of a task including the task parts, the method comprising:
   dividing the task, as a whole, into a plurality of work units to be executed chronologically during execution of the task, wherein work for one or more of the task parts is to be performed during execution of each of the work units;
   displaying on a display device a plurality of progress bars each corresponding to one of the task parts, each of the progress bars being aligned in time with respect to each other and each including a corresponding plurality of sequential non-overlapping display units, each of the display units corresponding to one of the work units; and
   as each of the work units is executed during execution of the task, indicating for each of the task parts, via the corresponding display units for that task part, whether work was performed for that task part during execution of that work unit, wherein the task is a processing of a plurality of messages forming a packetized data transmission, and
   wherein the work units are each a processing of a substantially equal number of the messages.

2. The method of claim 1, wherein indicating for each of the task parts whether work was performed for that task part during execution of that work unit comprises displaying the display unit corresponding to the work unit of the progress bar corresponding to that task part in a color that is coded to indicate whether work was performed during execution of that work unit.

3. The method of claim 1, wherein the display units are blocks.

4. The method of claim 1, wherein the display units are icons.

5. The method of claim 1, further comprising, as each of the work units is executed during execution of the task, indicating for each of the task parts, via the display device, whether an event occurred for that task part during execution of that work unit by displaying the display unit corresponding to that work unit of the progress bar corresponding to that task part in a color that is coded to indicate whether an event occurred during execution of that work unit.

6. The method of claim 5, wherein the event is an error.

7. The method of claim 1, further comprising, in response to a predetermined user interaction with a particular display unit of a particular progress bar corresponding to a particular task part, displaying additional information about the work performed for the particular task part during execution of the work unit corresponding to the particular display unit.

8. The method of claim 7, wherein the predetermined user interaction is a graphical pointer hover.

9. The method of claim 1, wherein work for two or more of the task parts is to be performed in parallel.

10. A computer-implemented method for graphically indicating a progress of a plurality of task parts in relation to a progress of a task including the task parts, the method comprising:
    dividing the task, as a whole, into a plurality of work units to be executed chronologically during execution of the task, wherein work for one or more of the task parts is to be performed during execution of each of the work units;
    displaying on a display device a plurality of progress bars each corresponding to one of the task parts, each of the progress bars being aligned in time with respect to each other and each including a corresponding plurality of sequential non-overlapping display units, each of the display units corresponding to one of the work units; and
    as each of the work units is executed during execution of the task, indicating for each of the task parts, via the corresponding display units for that task part, whether work was performed for that task part during execution of that work unit, wherein the task is a processing of a plurality of messages forming a packetized data transmission, and wherein the plurality of task parts are each a processing of data pertaining to a different logical protocol layer of the messages.

11. The method of claim 10, wherein the work units correspond to predetermined units of time.

12. The method of claim 10, wherein the plurality of task parts are:
    a processing of framing protocol (FP) message data;
    a processing of H.223 data;
    a processing of H.245 data;
    a processing of audio data; and
    a processing of video data.

13. An apparatus for causing a computer having a display device to graphically indicate on the display device a progress of a plurality of task parts in relation to a progress of a task including the task parts, the apparatus comprising:
    a non-transitory computer-readable medium; and
    computer-readable code, stored on the non-transitory computer-readable medium, for causing the computer to execute a method including:
        dividing the task, as a whole, into a plurality of work units to be executed chronologically during execution of the task, wherein work for one or more of the task parts is to be performed during execution of each of the work units;
        displaying on the display device a plurality of progress bars each corresponding to one of the task parts, each of the progress bars being aligned in time with respect to each other and each including a corresponding plurality of sequential non-overlapping display units, each of the display units corresponding to one of the work units; and
        as each of the work units is executed during execution of the task, indicating for each of the task parts, via the corresponding display units for that task part, whether work was performed for that task part during execution of that work unit,
    wherein the task is a processing of a plurality of messages forming a packetized data transmission, and wherein the work units are each a processing of a substantially equal number of the messages.

14. The apparatus of claim 13, wherein indicating for each of the task parts whether work was performed for that task part during execution of that work unit comprises displaying the display unit corresponding to that work unit of the progress bar corresponding to that task part in a color that is coded to indicate whether work was performed during execution of that work unit.

15. The apparatus of claim 13, wherein the display units are blocks.

16. The apparatus of claim 13, wherein the method further includes, as each of the work units is executed during execution of the task, indicating for each of the task parts, via the display device, whether an event occurred for that task part during execution of that work unit by displaying the display unit corresponding to that work unit of the progress bar corresponding to that task part in a color that is coded to indicate whether an event occurred during execution of that work unit.

17. The apparatus of claim 16, wherein the event is an error.

18. The apparatus of claim 13, wherein work for two or more of the task parts is to be performed in parallel.

19. An apparatus for causing a computer having a display device to graphically indicate on the display device a progress of a plurality of task parts in relation to a progress of a task including the task parts, the apparatus comprising:
 a non-transitory computer-readable medium; and
 computer-readable code, stored on the non-transitory computer-readable medium, for causing the computer to execute a method including:
  dividing the task, as a whole, into a plurality of work units to be executed chronologically during execution of the task, wherein work for one or more of the task parts is to be performed during execution of each of the work units;
  displaying on the display device a plurality of progress bars each corresponding to one of the task parts, each of the progress bars being aligned in time with respect to each other and each including a corresponding plurality of sequential non-overlapping display units, each of the display units corresponding to one of the work units; and
 as each of the work units is executed during execution of the task, indicating for each of the task parts, via the corresponding display units for that task part, whether work was performed for that task part during execution of that work unit,
 wherein the task is a processing of a plurality of messages forming a packetized data transmission, and wherein the plurality of task parts are each a processing of data pertaining to a different logical protocol layer of the messages.

* * * * *